United States Patent

[11] 3,627,918

[72] Inventor Donald Clark Redpath Winchester, Mass.
[21] Appl. No. 872,621
[22] Filed Oct. 30, 1969
[45] Patented Dec. 14, 1971
[73] Assignee Itek Corporation Lexington, Mass.

[54] MULTIPLE IMAGE REGISTRATION SYSTEM
31 Claims, 7 Drawing Figs.

[52] U.S. Cl. 178/6.8, 250/220 SP, 356/167, 356/2
[51] Int. Cl. H04n 3/28, H04n 7/18, H01j 39/12
[50] Field of Search 356/2, 167, 203, 206; 250/220 SP; 178/6.5, 6.8; 235/181

[56] References Cited
UNITED STATES PATENTS
3,432,674 3/1969 Hobrough 356/2
3,513,257 5/1970 Hobrough 356/2

*Primary Examiner*—Benedict V. Safourek
*Assistant Examiner*—Joseph A. Orsino, Jr.
*Attorneys*—Homer O. Blair and Robert L. Nathans ABSTRACT: An image registration system in which scanning patterns directed through a pair of images are used in a conventional manner to generate video signals that are in turn correlated and analyzed producing error signals. The error signals are then differentially modulated with reference signals producing modulated and complementary modulated error signals of opposite polarity. Selective combination of the reference and modulated error signals is accomplished with low noise and relatively simple circuitry and results in balanced pairs of deflection signals that induce equal but opposite transformations of the scanning patterns in senses tending to eliminate relative image distortion represented by the error signals.

Inventor:
Donald C. Redpath,
by John E. Toupal
Attorney

Inventor:
Donald C. Redpath,
by John E. Toupal
Attorney

Inventor:
Donald C. Redpath,
by John E. Toupal
Attorney

Inventor:
Donald C. Redpath,
by John E. Toupal
Attorney

Inventor:
Donald C. Redpath,
by John E. Toupal
Attorney

Inventor:
Donald C. Redpath,
by John E. Toupal
Attorney

Inventor:
Donald C. Redpath,
by John E. Toupal
Attorney

MULTIPLE IMAGE REGISTRATION SYSTEM

BACKGROUND OF THE INVENTION

This invention relates generally to a dual image registration system and, more particularly, relates to an error signal modulation network for such a system.

Although not so limited, the present invention is particularly well suited for use with image registration systems employed during the production of topographic maps. Typically, maps of this type are obtained from stereoscopically related photographs taken from airplanes. When the photographs are accurately positioned in locations corresponding to the relative positions in which they were taken, their projection upon a suitable base can produce for an observer a three-dimensional presentation of the particular terrain imaged on the photographs. Also, according to well-known techniques, data indicating the relative elevations of specific points in the aligned images can be obtained.

The stereo photographs, however, generally do not possess images of exactly corresponding surface areas. For this reason a coherent stereo presentation is obtained only if the photographs are properly registered, i.e. so positioned that homologous areas in the two projections are aligned and have the same orientation. The problem of image registration is accentuated by the fact that image detail in the photographs typically is not identical in all respects. Such detail nonuniformity is caused, for example, by photographing a scene from different camera viewpoints in the photographic aircraft. The resultant distortion between corresponding areas in the photographs prevents common detail registration when the images retained by both photographs are projected onto a common viewing plane.

There have been developed several types of systems which simplify the registration of stereo images. Basically, most such systems derive video signals from image detail in each photograph of a stereogram and then correlate and analyze the video signals to produce error signals indicating various types of distortion. These error signals are used to control image displacement and transformation equipment that produce registration of the projected images. The image transformation can be accomplished, for example, by altering the rasters in the scanning devices utilized, by introducing relative movement between the two photographs, by controlling adjustable optical devices used for projection of the images, etc. The present invention is directed toward the first named systems that alter scanning pattern raster shapes to achieve registration. Examples of stereo image registration system of this type are disclosed in U.S. Pat. No. 3,432,674 of Gilbert L. Hobrough issued Mar. 11, 1969; and U.S. application Ser. No. 839,940 entitled "Multiple Image Registration System" filed July 8, 1969 both assigned to the assignee of this invention.

Most raster transformation systems facilitate registration of the dual images by simultaneously transforming in an opposite sense the two scanning rasters utilized. To create the opposite transformations, the amplitudes of the deflection signals used for generating the two rasters must be altered by equal but opposite amounts required to eliminate detected image detail misregistration. Prior dual image misregistration systems required relatively complicated circuitry to produce this equal but opposite correction of scanning raster deflection signals. In addition, the previously utilized circuits have exhibited relatively high noise levels.

The object of this invention, therefore, is to provide a dual image registration apparatus with an improved system for producing equal but opposite scanning raster transformations that eliminate detected image detail misregistration.

CHARACTERIZATION OF THE INVENTION

The invention is characterized by the provision of an image registration system including scanning tubes for simultaneously detecting first and second scanning beams over corresponding paths in a pair of photographic images having homologous detail content. Video signals representing detail in the corresponding paths scanned by the beams are correlated producing a raw error signal indicative of composite misregistration existing between the scanned image detail. An analyzer circuit analyzes the raw error signal with respect to scanning raster reference signals producing analyzed error signals representing particular types of existing misregistration. A modulation network differentially modulates the analyzed error signals with at least one of the reference signals producing modulated error and complementary modulated error signals of opposite polarity.

The differentially modulated error signals and the reference signal are combined so as to produce one deflection signal having a value proportional to the algebraic summation of the reference signal and the modulated error signals of one polarity and another deflection signal having a value proportional to the algebraic summation of the reference signal and the complementary error signals of the opposite polarity. Application of the one deflection signal to one of the scanner tubes and of the other deflection signal to the other scanner tube induces equal but opposite transformations of the scanning rasters in senses required to eliminate the misregistration represented by the analyzed error signals. Because of the differential modulation produced by the modulator network, combination of the modulated error signals and the reference signal to produce the desired deflection signals is greatly simplified and can be accomplished with conventional operational summing amplifier circuitry.

One feature of the invention is the provision of an image registration system of the above type wherein the modulation network includes a plurality of modulators each comprising a dual, matched field effect transistor having common drain electrodes connected to receive one of the analyzed error signals. The modulating reference signal is applied differentially to the gate electrodes of the dual transistor whose dual outputs are amplified by a differential amplifier producing the modulated error signals of opposite polarity in an efficient and simple manner.

According to another feature of the invention, the combining circuit combines the reference signal with the modulated error signals of one polarity producing a first summation signal and produces a second summation signal by combining the complementary modulated error signals of opposite polarity with a complementary reference signal obtained by inverting the polarity of the primary reference signal. The difference between the first and second summation signals is then obtained producing one of the deflection signals. Similarly, the primary reference signal and the complementary modulated error signals are combined producing a third summation signal and the complementary reference signal and modulated error signals combined producing a fourth summation signal. Obtaining the difference between the third and fourth summation signals results in the generation of the other deflection signal required for the equal but opposite transformations of the scanning rasters. By transferring the balanced differential error and reference signals throughout the combining circuit in this way, considerable system noise rejection is achieved.

Another feature of the invention is the provision of an image registration system of the above types wherein the modulation network includes a modulator that differentially modulates a scanning raster size control signal with the reference signal producing modulated reference control signals of opposite polarity. These modulated reference control signals are applied to the modulators receiving the error signals so as to produce the desired differential modulation thereof. According to this arrangement, automatic raster size control is also provided with balanced differential signals.

In a preferred embodiment of the invention the reference signals include $x$ and $y$ reference signals suitable for generating scanning rasters having lines oriented in orthogonally related $x$ and $y$ directions. As described in the above noted patent and patent application the use of scanning patterns with orthogonal scanning lines facilitates the analysis of the raw error signal and results in $x$-error signals representing image detail misregistration in the x-direction of scan and y-error signals representing image detail misregistration in the y-direction of scan. To provide for scanning raster transformations in both the x and y directions of scan, the x-error signals are differentially modulated with the x-reference signal and the y-error signals are differentially modulated with the y-reference signal. The resultant modulated and complementary modulated x-error signals are combined with the x-reference signal to produce a pair of x-deflection signals that produce equal but opposite corrective transformations in the x-direction of scan. Similarly, the modulated and complementary modulated y-error signals are combined with the y-reference signal producing a pair of y-deflection signals that produce equal but opposite corrective transformations in the y-direction of scan.

DESCRIPTION OF THE DRAWINGS

These and other objects and features of the present invention will become more apparent upon a perusal of the following specification taken in conjunction with the accompanying drawings wherein.

DESCRIPTION OF THE PREFERRED EMBODIMENT

Figure 1:
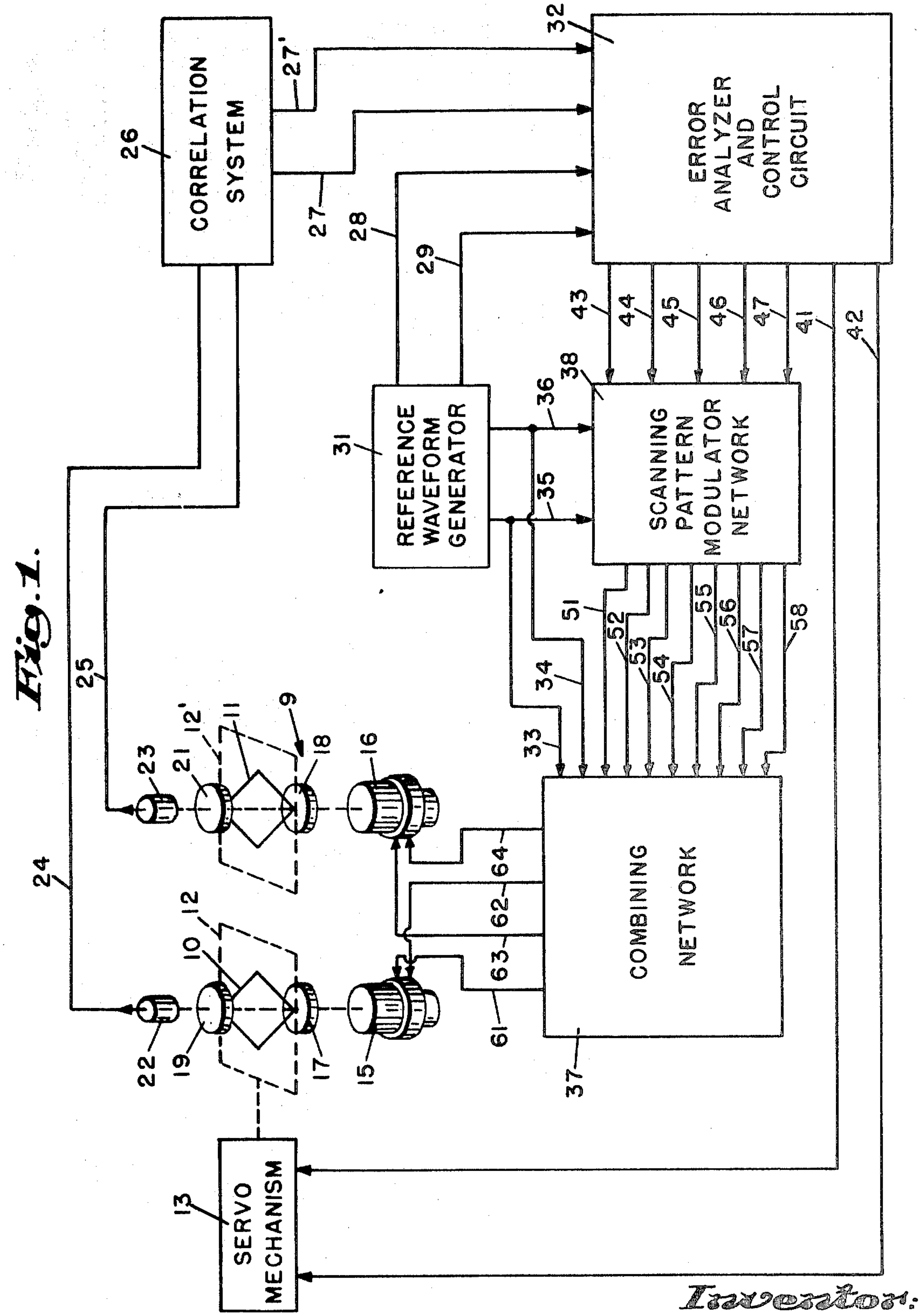
FIG. 1 is a general block diagram illustrating the functional interrelation of the main components of the system.

For a general description of the invention, reference is made to FIG. 1 wherein a pair of stereo photographs 10 and 11 are positioned in a scanning system 9. The photographs are mounted on parts 12 and 12' of a support carriage. Selective relative movement between the photographs 10 and 11 is produced by a servo mechanism 13 operatively coupled to the carriage part 12. A pair of cathode ray tubes 15 and 16 direct scanning beams upwardly through the transparent photographs 10 and 11 as diagrammatically indicated. Focusing the beams onto the photographs 10 and 11 are lens systems 17 and 18. The light energy transmitted by the phototransparencies 10 and 11 is focused by lens assemblies 19 and 21 to photomultipliers 22 and 23 which produce video analog signals on, respectively, lines 24 and 25. Because of the light energy modulation produced by the transparencies 10 and 11, video signals on lines 24 and 25 represent, respectively, the image detail being scanned.

The video signals on lines 24 and 25 are applied to a correlation system 26 that produces on line 27 a composite or "raw" error signal indicating the degree of relative displacement existing between the common image detail in the paths being simultaneously scanned within the transparencies 10 and 11. Also produced on line 27' is a cross-correlation signal that indicates correlation quality of the video signals on lines 24 and 25. Receiving the raw error signal on line 27, the cross-correlation signal on line 27' and x and y reference signals on lines 28 and 29, respectively, from a reference waveform generator 31 is an error analyzer and control circuit 32. The reference signals produced by the waveform generator 31 are also applied on lines 33, 34 and 35, 36 respectively to a combining network 37 and a scanning pattern modulator network 38. The reference signals generated by the generator 31 possess waveforms suitable for ultimately producing desired scanning rasters on the screens of the cathode ray tubes 15 and 16.

The error analyzer circuit 32 analyzes the composite error signal on line 27 with respect to the reference signals on lines 28 and 29 producing on lines 41 and 42, respectively, x-parallax and y-parallax error signals that are applied to the servo mechanism 13. The output on line 44 is a control signal that varies the size of the scanning rasters generated in tubes 15 and 16 in dependence upon various parameters. Also produced on lines 43 and 45–47, respectively, are x-scale, y-skew, y-scale and x-skew error signals indicating other types of distortion detected by the error analyzer circuit 32. These latter signals are applied to the scanning pattern modulator network 38 for modulation by the reference signals on lines 35 and 36 as described in greater detail below. Resultant modulated error signals on lines 51–58 are applied to the combining network 37 and combined with the reference signals on lines 33 and 34 as also described in greater detail below. The outputs of the combining network 37 on lines 61–64 are deflection signals applied to the deflection coils of the cathode ray tubes 15 and 16.

The specific circuit details of the scanning system 9, the correlation system 26, the error analyzer and control circuit 32 and the reference waveform generator 31 do not, per se, form the part of the present invention. Consequently, a detailed description of these systems is believed unnecessary. However, circuits of this type suitable for use in the present invention are disclosed in the above noted U.S. Pat. No. 3,432,674 and U.S. application Ser. No. 839,940.

Figure 2:
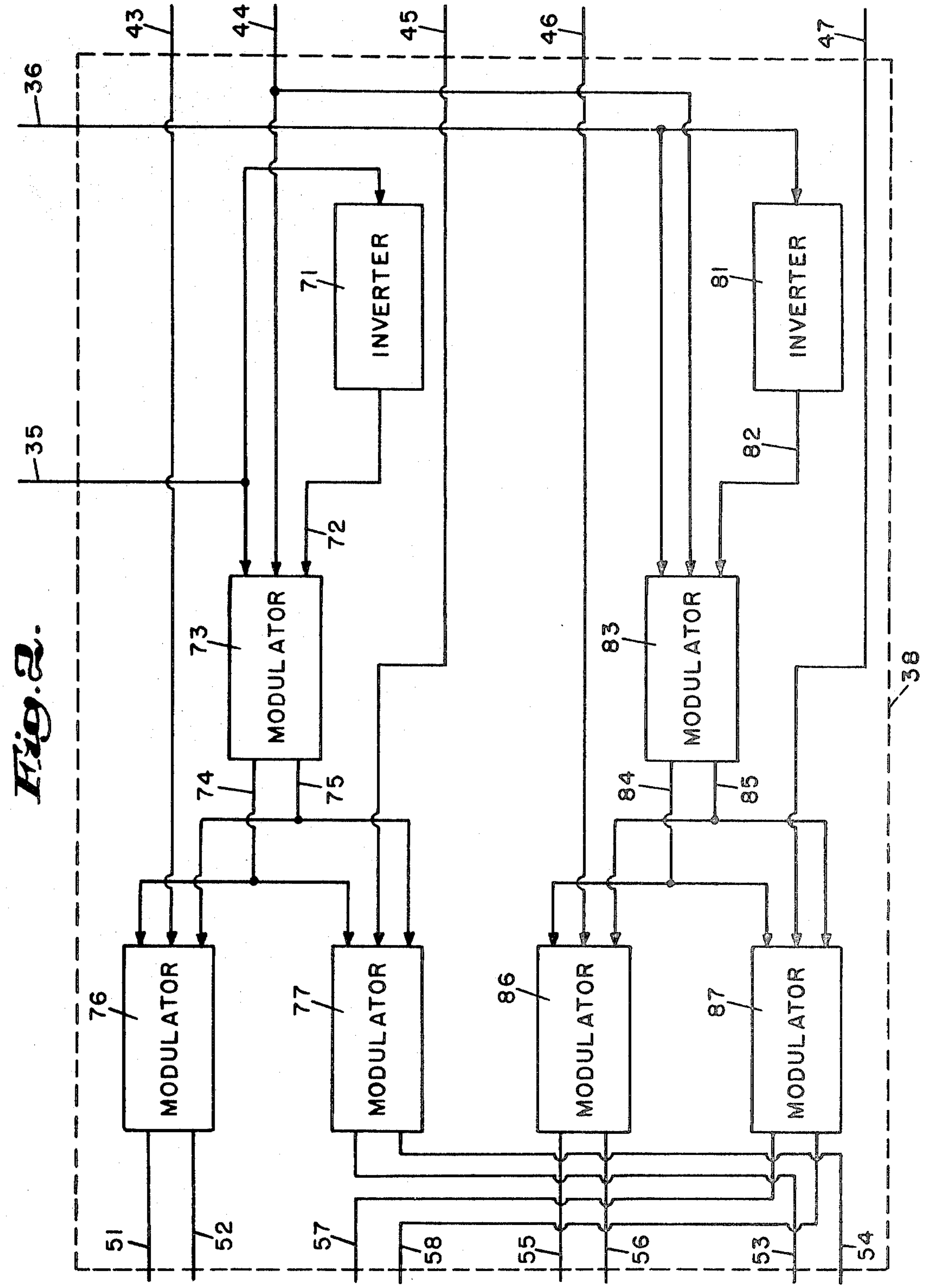
FIG. 2 is a block diagram of the scanning pattern modulator network shown in FIG. 1.

Referring now to FIG. 2 there is shown in block diagram form the scanning pattern modulator network 38 shown in FIG. 1. An inverter circuit 71 receives the x-reference signal on line 35 producing a polarity inverted complementary x-reference signal on line 72. This signal and the x-reference signal on line 35 are applied to a modulator 73 and used, as described in greater detail below, to differentially modulate the raster size control signal received on line 44. The x-modulated control output signals of the modulator 73 on lines 74 and 75 are applied to both a modulator 76 and a modulator 77 and used to differentially modulate, respectively, the x-scale error signal on line 43 and the y-skew error signal on line 45. Resultant modulated and complementary modulated x-scale error signals of opposite polarity appear on, respectively, lines 51 and 52. Similarly modulated and complementary modulated y-skew error signals of opposite polarity appear on, respectively, lines 53 and 54.

The y-reference signal on line 36 is inverted in an inverter 81 and applied on line 82 to a modulator 83 also identical to the modulator 73. Differential modulation of the raster size control signal on line 44 by the y-reference signal on line 36 and the polarity inverted complementary y-reference signal on line 82 results in y-modulated control signal outputs on lines 84 and 85. These signals are applied to both a modulator 86 and a modulator 87 both of which are identical to the modulator 73. The modulators 86 and 87 also receive for modulation, respectively, the y-scale error signal on line 46 and the x-skew error signal on line 47. Differential modulation of these signals produces modulated and complementary modulated y-scale error output signals on lines 55 and 56, respectively, and modulated and complementary modulated x-skew error signals on lines 57 and 58, respectively.

Figure 3:
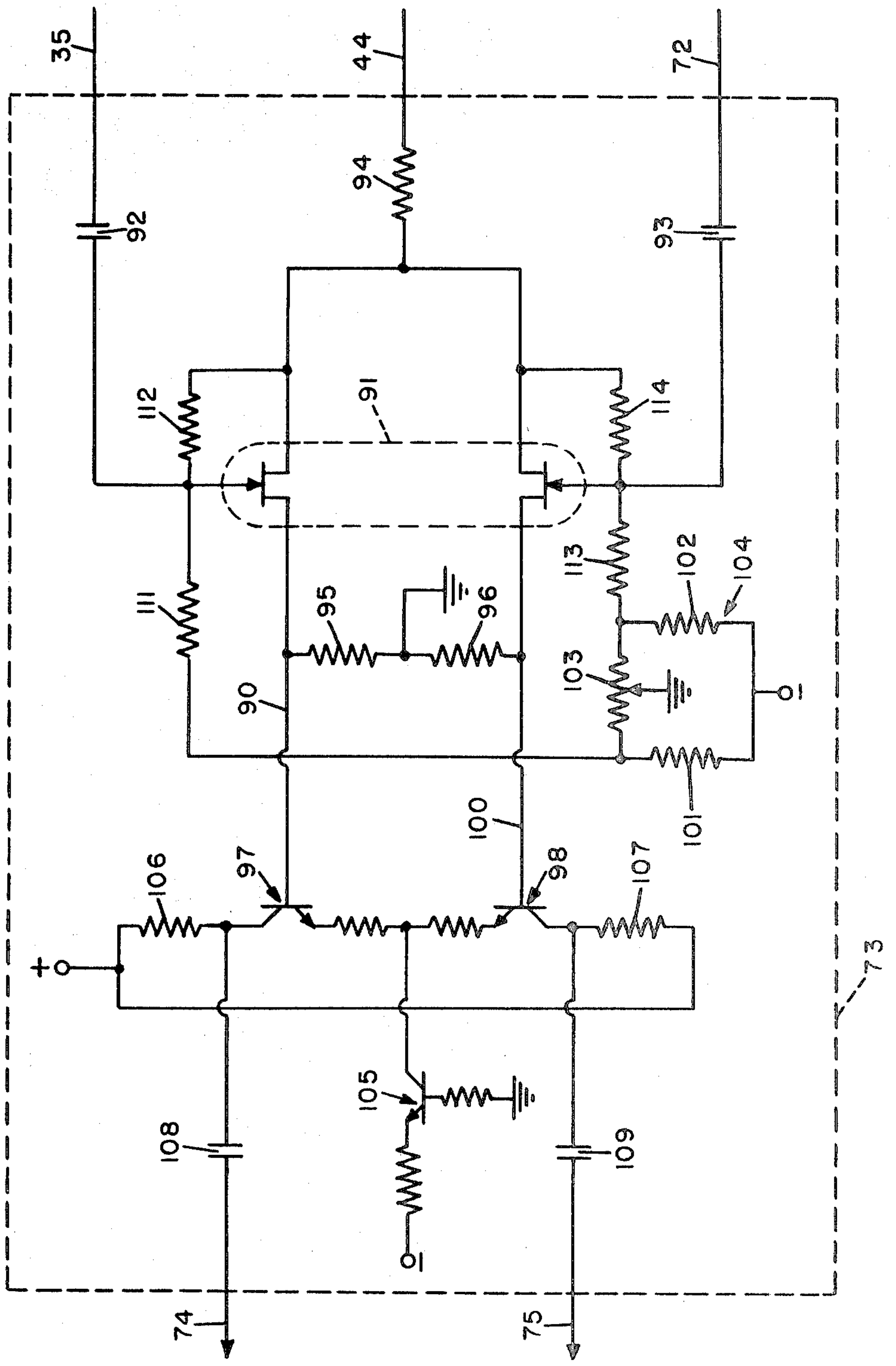
FIG. 3 is a circuit diagram of one of the modulators shown in FIG. 2.

FIG. 3 shows a circuit diagram of the modulator 73 shown in FIG. 2 which as noted above is identical to each of the modulators 76, 77, 83, 86 and 87. The x-reference and complementary x-reference signals on lines 35 and 72, respectively, are applied to the gate electrodes of a dual, matched field effect transistor 91 through coupling capacitors 92 and 93. Receiving the control signal on line 44 through the resistor 94 are common source electrodes of the transistor 91. Desired operating points for the gate electrodes of the dual transistor 91 are established by selection of appropriate values for resistors 101, 102 and 103 in an adjustment network 104. Minor variations in differential gain of the transistor 91 are compensated by adjustment of a variable resistor 103. The outputs of the dual transistor 91 are applied on lines 90 and 100 from output resistors 95 and 96, respectively, to the base electrodes of transistors 97 and 98 connected as a conventional differential amplifier. A transistor 105 provides a constant current source for the emitter electrodes of the amplifier transistors 97 and 98. The differential outputs of the amplifier are taken from load resistors 106 and 107 and applied, respectively, through coupling capacitors 108 and 109 to the output lines 74 and 75.

During typical operation of the modulator 73, the reference signals on lines 35 and 72 modulate the control signal on line 44 by varying the resistance provided by the matched transistors of the dual field effect transistor 91. With a zero control signal on line 44, no modulated signal will be present at the output. However, as the amplitude of the control signal on line 44 is varied, the modulated differential output levels on lines 74 and 75 follow, in a linear manner, up to the point where the voltages applied to the source gate electrodes of the matched transistor 91 produces a nonlinear change in resistance. Resistors 111–114 insure the application of approximately one-half of the control signal on line 44 to the gate electrodes thereby improving the range of the modulator 73. Thus the modulator 73 functions as a multiplier providing on lines 74 and 75 differential modulated outputs having amplitudes proportional to the value of the control signal on line 44 and polarities established, respectively, by the $x$-reference and complementary $x$-reference signals on lines 35 and 72. Since modulators 76, 77, 83, 86 and 87 are identical in both circuit detail and operation to modulator 73 no further description of these specific networks is believed necessary.

Figure 4:
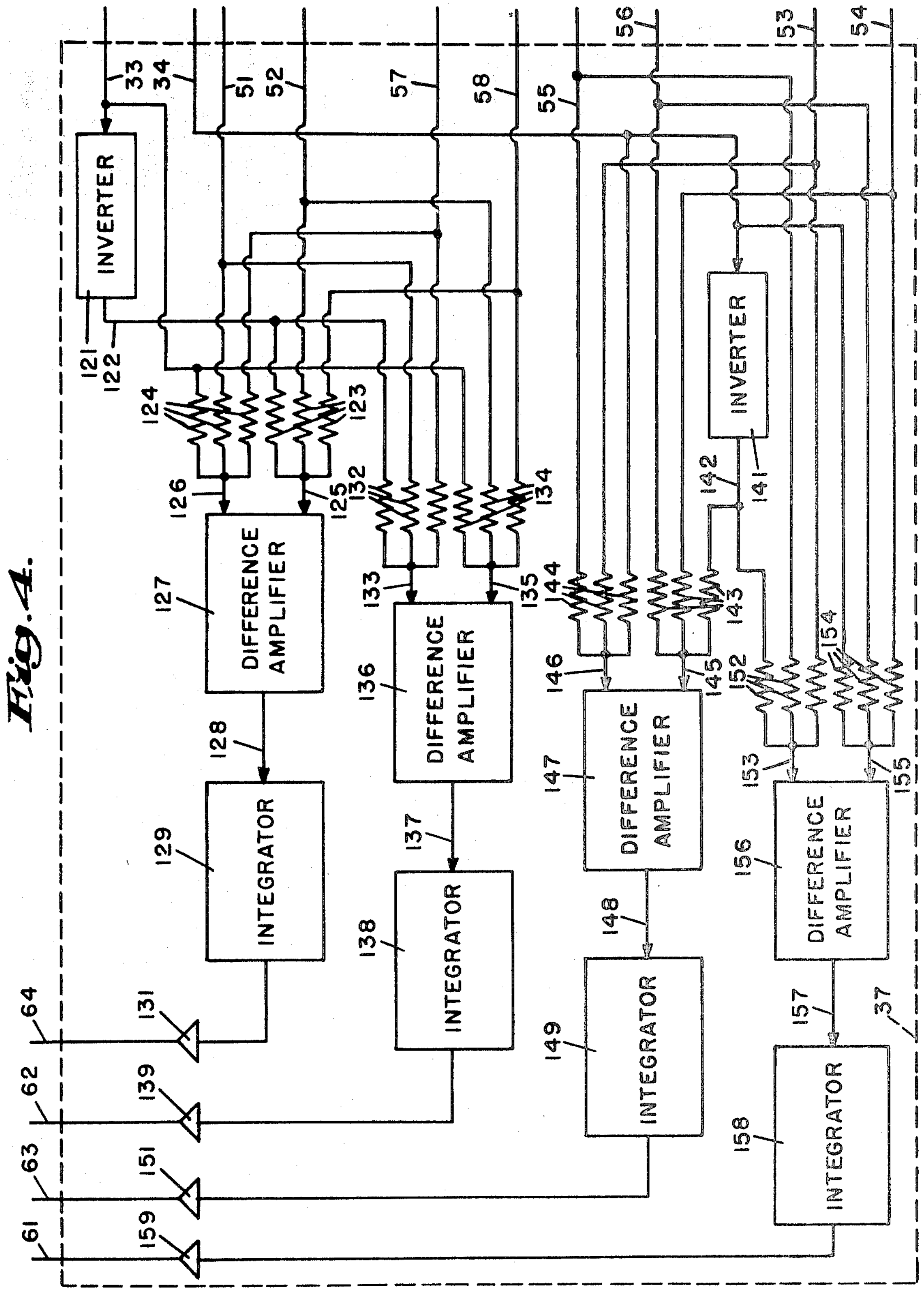
FIG. 4 is a circuit diagram of the combining network shown in FIG. 1.

Referring now to FIG. 4 there is shown a block circuit diagram of the combining network 37 shown in FIG. 1. The $x$-reference signal on line 33 is applied to an inverter 121 producing a complementary $x$-reference signal of opposite polarity on line 122 that is applied along with the complementary modulated $x$-error signals on lines 52 and 58 to a plurality of summing resistors 123. Another set of summing resistors 124 receive the $x$-reference signal on line 33 and the modulated $x$-error signals on lines 51 and 57. The summation outputs of the resistors 123 and 124, respectively, on lines 125 and 126 are applied to a difference amplifier 127 producing an amplified difference output signal on line 128. After integration in an integrator 129 and amplification in an amplifier 131 this signal appears on output line 64.

Similarly applied to summation resistors 132 are the complementary $x$-reference signal on line 122 and the modulated $x$-error signals on lines 51 and 57 producing a summation signal on line 133. The summation resistors 134 receive the $x$-reference signal on line 33 and the complementary modulated $x$-error signals on lines 52 and 58 producing a summation signal on line 135. Subtraction of the summation signals on lines 133 and 135 in a difference amplifier 136 results in a difference output signal on line 137 that is integrated in an integrator 138 and amplified in an amplifier 139.

The $y$-reference signal on line 34 is applied to an inverter 141 producing a complementary $y$-reference signal of opposite polarity on line 142 that is applied along with the complementary modulated $y$-error signals on lines 56 and 54 to a plurality of summing resistors 143. Another set of summing resistors 144 receive the $y$-reference signal on line 34 and the modulated $y$-error signals on lines 55 and 53. The summation outputs of the resistor networks 143 and 144 on lines 145 and 146, respectively, are applied to the difference amplifier 147 producing an amplified difference signal on line 148. After integration in an integrator 149 and amplification in an amplifier 151 this signal appears on output line 63.

Similarly applied to summation resistors 152 are the complementary $y$-reference signal on line 142 and the modulated $y$-error signals on lines 55 and 53 producing a summation signal on line 153. The summation resistors 154 receive the $y$-reference signal on line 34 and the complementary modulated $y$-error signal on lines 56 and 54 producing a summation signal on line 155. Subtraction of the summation signals on lines 153 and 155 in a difference amplifier 156 results in a difference output signal on line 157 that is integrated in an integrator 158 and amplified in an amplifier 159.

According to a preferred mode of operation, the rasters produced in the cathode ray tubes 15 and 16 are formed by scanning lines oriented in orthogonally related $x$ and $y$ directions. Circuit details of reference waveform generators suitable for initiating patterns of this type are well-known and are disclosed, for example, in the above noted U.S. Pat. No. 3,432,674 and U.S. application Ser. No. 839,940. Typically, the initial $x$ and $y$ reference waveforms are square-waves. These are integrated producing triangular waveforms that generate the desired scanning patterns which applied to the deflection coils of the cathode ray tubes 15 and 16. Analyzation in the error analyzer circuit 32 of the composite error signal on line 27 with the $x$ and $y$ reference signals on lines 28 and 29 results in error signals that uniquely indicate image detail misregistration existing in each of the $x$ and $y$ scanning directions. Thus, for example, the signals on lines 43 and 45, respectively, represent scale and skew error in the $x$-direction of scan and the signals on lines 46 and 47, respectively, represent scale and skew errors in the $y$-direction of scan.

During operation of the modulator network 38 shown in FIG. 2, the raster size control signal on line 44 is applied to the modulator 73 along with the $x$-reference signal on line 35 and the complementary $x$-reference signal output of inverter 71 on line 72. As described above in connection with FIG. 3, the raster size control signal is differentially modulated by the reference signals on lines 35 and 72. The resultant modulated control signals on output lines 74 and 75 have amplitudes proportional to the value of the control signal on line 44 and polarities identical, respectively, to the modulating $x$-reference and complementary $x$-reference signals on lines 35 and 72. Receiving the control reference signals on lines 74 and 75 are both the modulator 76 and the modulator 77 which also receive, respectively, the $x$-scale error signal on line 43 and the $y$-skew error signal on line 45. As noted above, the modulators 76 and 77 are identical to the modulator 73 shown in FIG. 3. Thus, the $x$-scale error signal is differentially modulated by the control reference signals producing on lines 51 and 52, respectively, a modulated $x$-scale error signal and a complementary modulated $x$-scale error signal. These latter signals have amplitudes proportional to the values of the raster size control and $x$-scale error signals and polarities determined by the polarities of the modulating control reference signals on lines 74 and 75 which are in turn established in the modulator 73 by the polarities of the $x$-reference and complementary $x$-reference signals on lines 35 and 72, respectively. Similarly, the $y$-skew error signal on line 45 is modulated in the modulator 77 producing a modulated $y$-skew error signal on output line 53 and a complementary modulated $y$-skew error signal on output line 54. These signals also have polarities determined by the $x$reference and complementary $x$-reference signals but have amplitudes proportional to the values of the raster size control and $y$-skew error signals.

The modulator 83 differentially modulates the raster size control signal on line 44 with the $y$-reference signal on line 36 and the complementary $y$-reference signal of opposite polarity produced by the inverter 81 on line 82. The resultant modulated $y$-reference control signals on output lines 84 and 85 are used to differentially modulate the $y$-scale error signal on line 46 and the $x$-skew error signal on line 47 in, respectively, the modulators 86 and 87. Consequently, the outputs of the modulator 86 on lines 55 and 56, respectively, are a modulated $y$-scale error signal and a complementary modulated $y$-scale error signal. Similarly, a modulated $x$-skew error signal and a complementary modulated $x$-skew error signal are produced on output lines 57 and 58, respectively, by the modulator 87. As above the modulated error signals have polarities determined by the polarities of the $y$-reference and complementary $y$-reference signals and amplitude proportional to the values of the raster size control signals and either the $y$-scale error or $x$-skew error signals.

Referring now to FIG. 4, the x-reference and complementary x-reference signals on lines 33 and 122, the modulated and complementary modulated x-scale error signals on lines 51 and 52 and the modulated and complementary modulated x-skew signals on lines 57 and 58 are summed by the resistor networks 123 and 124 as described above. Subtraction of the resultant summation signals in the difference amplifier 127 produces on line 128 an x-deflection signal with an amplitude proportional to the sum of the amplitudes of the x-reference signal on line 33, the modulated x-scale error signal on line 51 and the modulated x-skew error signal on line 57. Combining of the signals on lines 33, 51, 52, 57, 58 and 122 in different combinations in the resistor networks 132 and 134 results in another pair of summation signals that are applied to the difference amplifier 136. The output of the amplifier 136 is another x-deflection signal having a value proportional to the sum of the amplitudes of the x-reference signal on line 33, the complementary modulated x-scale error signal on line 52 and the complementary modulated x-skew error signal on line 58. After integration in integrators 129 and 138 and amplification in amplifiers 131 and 139, the x-deflection signals on lines 64 and 62, respectively, are applied to the x-deflection coils of the cathode ray tubes 16 and 15. Because of the operations performed in the modulation network 38 and combining network 37, these deflection signals introduce equal but opposite transformations of the scanning rasters in senses required to eliminate the x-direction misregistration represented by the x-scale and x-skew error signals on lines 43 and 45.

Figure 5:
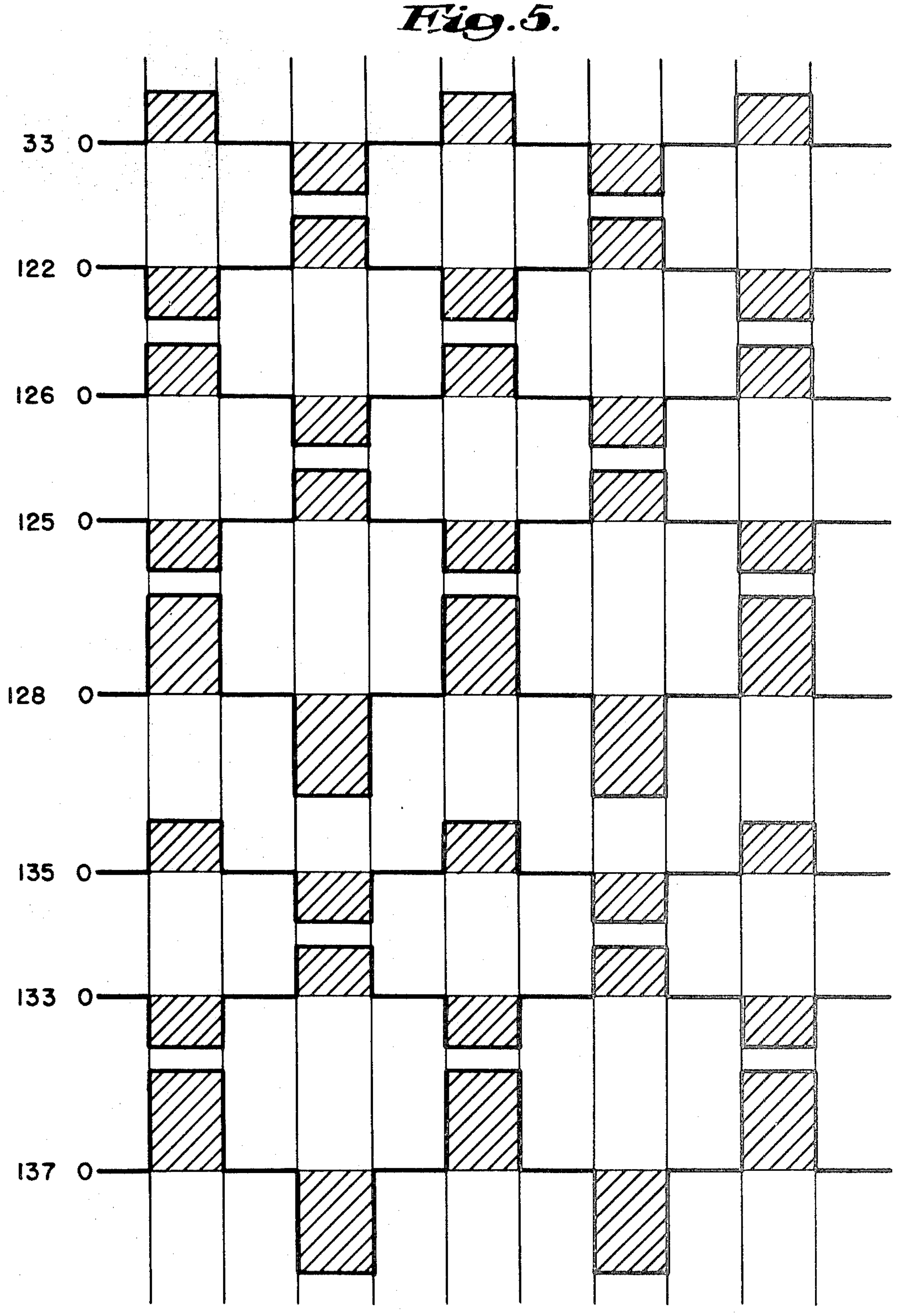
FIG. 5 is a graph illustrating a plurality of typical waveforms generated in the combining network shown in FIG. 4.

To more clearly illustrate the operation of the difference amplifier 127 reference is now made to FIG. 5 which shows a plurality of typical waveforms. For convenience, the respective waveforms are identified in FIG. 5 by the numbers applied to the signal lines on which they appear and are related to each other in a time sense. The three level x-reference signal on line 33 is adapted for generating a particularly desirable scanning pattern as disclosed in the above noted U.S. Pat. application Ser. No. 839,940. Inversion of this signal in the inverter 121 produces the illustrated complementary reference signal on line 122. The illustrated waveforms assume an operating period in which the error analyzer circuit 32 (FIG. 1) detects no x-scale or x-skew error and, therefore, produces no error signals on lines 43 and 47. In response to this condition, the modulators 76 and 87 do not generate modulated error signals on lines 51, 52, 57 and 58. Thus, as shown in FIG. 5 only the x-reference signal on line 33 is transmitted by summing networks 124 and 134 to the summation lines 126 and 135. For the same reason, only the complementary x-reference signal on line 122 appears on the summation lines 125 and 133. Subtraction of the signal on line 125 from that on line 126 in the difference amplifier 127 produces on output line 128 an amplified three-level deflection signal having the same phase as the x-reference signal on line 33. Similarly, subtraction of the signal on line 133 from the signal on line 135 in the difference amplifier 136 produces on line 137 another three-level deflection signal identical in amplitude and phase to the deflection signal on line 128. Thus, in the absence of x-scale and x-skew error, identical deflection signals are applied to the x-deflection circuits of the cathode ray tubes 15 and 16 (FIG. 1).

Figure 6:
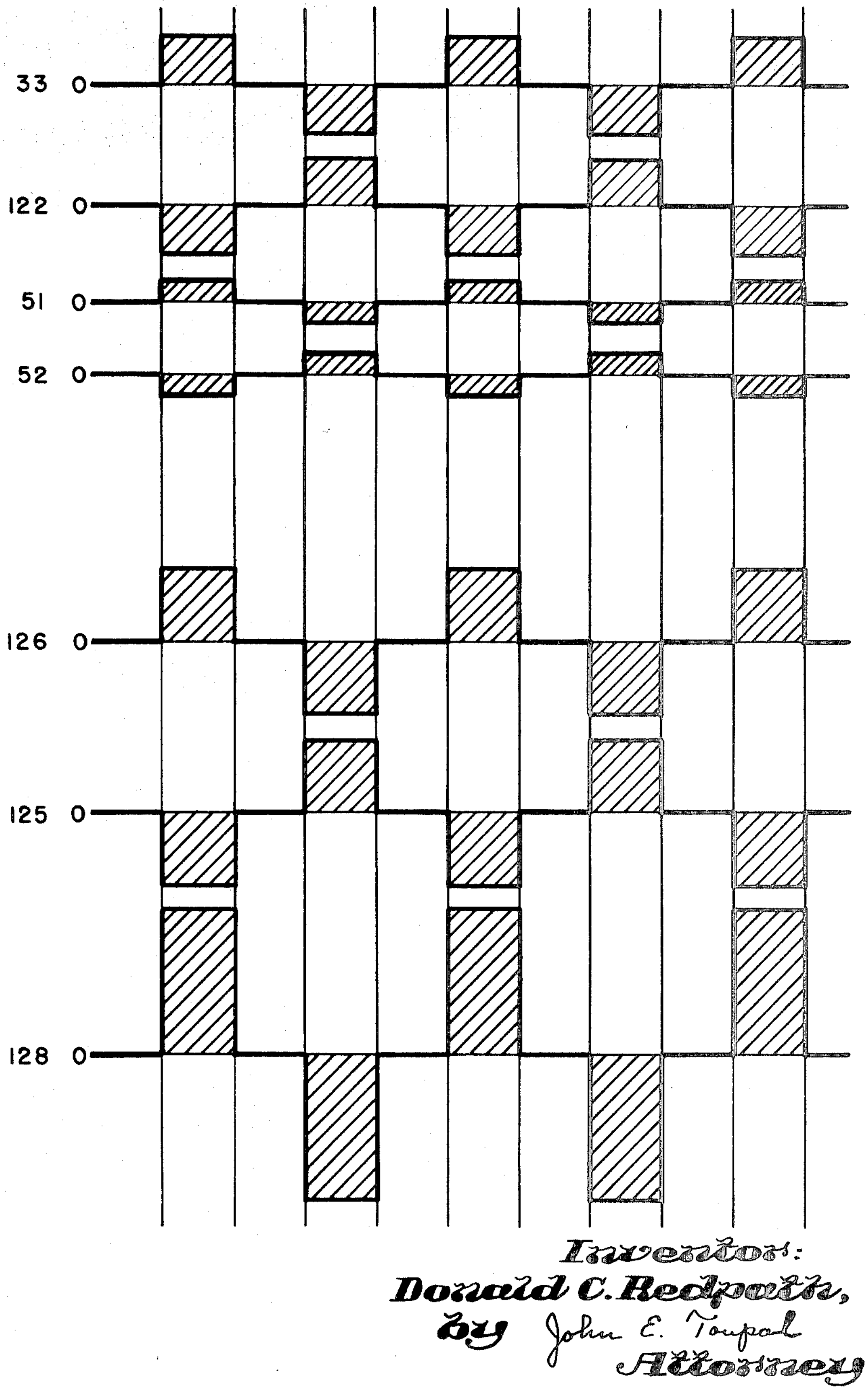
FIG. 6 is a graph illustrating other typical waveforms generated in the combining network shown in FIG. 4.

Reference is next made to FIG. 6 wherein the waveforms shown are again identified by the numbers applied to the signal lines on which they appear and are related to each other in a time sense. The x-reference and complementary x-reference signals on lines 33 and 122 are identical to those shown in FIG. 5. However, the illustrated waveforms for the modulated x-scale error signal on line 51 and the complementary modulated x-scale error signal on line 52 assume the presence of a constant valued direct current x-scale error signal on output line 43 of the error analyzer circuit 32 (FIG. 1). The modulated x-scale error signals on lines 51 and 52 have amplitudes proportional to the value of the assumed x-scale error signal on line 43 but three-level waveforms and phases identical, respectively, to the x-reference and complementary x-reference signals on lines 33 and 122 because of the differential modulation occurring in the modulator 76 (FIG. 2). For reasons of simplicity, assumption is again made that no x-skew error is detected. Accordingly, no x-skew error signal is generated on line 47 and no modulated and complementary modulated x-skew error signals are present on output lines 57 and 58 of the modulator 87.

Addition of the x-reference signal on line 33 with the modulated x-scale error signal on line 51 produces a three-level summation signal on line 126 while addition of the complementary x-reference signal on line 122 and the complementary modulated x-scale error signal on line 52 produces a three-level summation signal of opposite polarity on line 125 as shown in FIG. 6. Subtraction of the summation signal on line 125 from the summation signal on line 126 in the difference amplifier 127 produces on line 128 an x-deflection signal having an amplitude greater than the amplitude of the no x-scale error deflection signal shown in FIG. 5 by an amount proportional to the degree of x-scale error represented by the value of the error signal on line 43.

Figure 7:
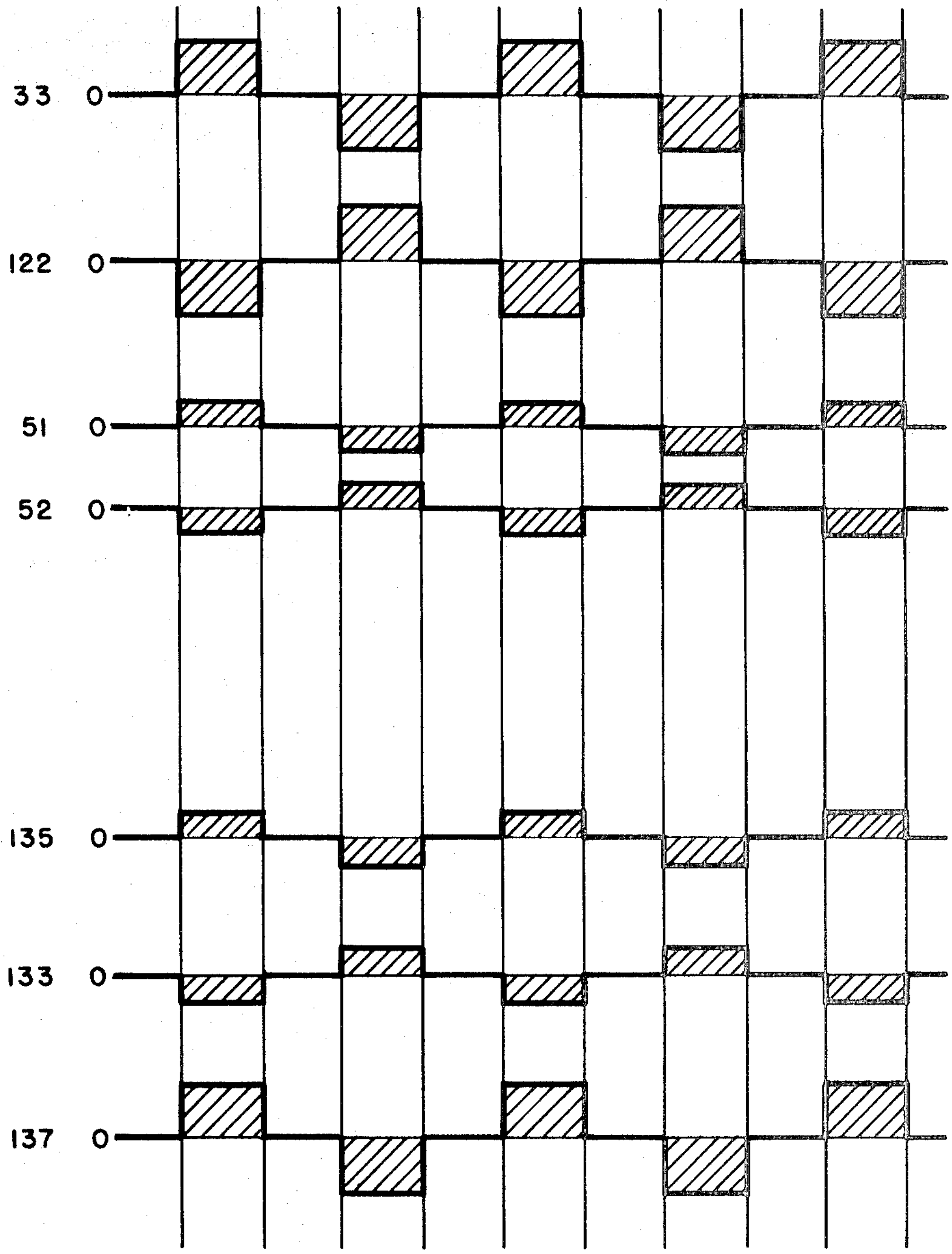
FIG. 7 is a graph showing other waveforms generated in the combining network shown in FIG. 4.

FIG. 7 depicts waveforms for signal lines 33, 122, and 51–54 under the same set of conditions assumed for FIG. 6. Addition of the x-reference signal on line 33 with the complementary modulated x-scale error signal on line 52 produces on line 135 a three-level summation signal with the phase of the x-reference signal but with a reduced amplitude. Similarly, addition of the complementary x-reference signal on line 122 with the modulated x-scale error signal on line 51 produces on line 133 a summation signal having the phase of the complementary x-reference signal but a reduced amplitude. Subtraction of the summation signal on line 133 from the summation signal on line 135 in the difference amplifier 136 produces on line 137 another x-deflection signal having an amplitude less than that of the no x-scale error x-deflection signal illustrated in FIG. 5 by an amount proportional to the degree of x-scale distortion represented by the level of the error signal on line 43.

Thus, in response to the error conditions assumed above, the combining network 37 (FIG. 1) provides on line 64 one x-deflection signal that enlarges the scanning pattern of cathode ray tube 16 in the x-direction of scan and produces on line 62 another x-deflection signal that decreases the size of the scanning pattern of cathode ray tube 15 in the x-direction of scan. Obviously, equal but opposite transformations in the scanning patterns are of senses that tend to eliminate the x-scale distortion represented by the error signal on line 43. It will be apparent that an x-skew error signal on line 47 would result in modulated x-skew error signals on line 57 and 58 that, in an analogous manner, introduce equal but opposite correction changes in the x-deflection signals on lines 62 and 64.

The summation networks 143, 144, 152 and 154 and the difference amplifiers 147 and 156 combine the y-reference signal on line 34, the complementary y-reference signal on line 142 and the modulated and complementary modulated y-scale and y-skew error signals on lines 53–56 in a manner analogous to that in which the x-reference and modulated x-error signals are combined by the summation networks 123, 124, 132 and 134 and the difference amplifiers 127 and 136. Thus, the combining network 37 also produces on line 63 one y-deflection signal that is applied to the y-deflection coil of cathode ray tube 16 and another y-deflection signal on line 61 that is applied to the y-deflection coil of the cathode ray tube 15. As described above, in connection with the x-deflection signals on lines 62 and 64, the y-deflection signals on lines 61 and 63 introduce equal but opposite transformations y-deflection coil of the the scanning patterns of the cathode ray tubes 15 and 16 so as to correct y-scale and y-skew distortion represented by the error signals on lines 46 and 45.

Obviously, many modifications and variations of the present invention are possible in light of the above teachings. For example only, beam producing devices other than the illustrated cathode ray tubes could be used to generate video signals or the modulator network 38 could be used with reference, error and control signals other than those specifically described. Also, although the disclosed combining network 37 wherein deflection signals are produced by obtaining the difference between balanced pairs of summation signals in each of the difference amplifiers 127, 136, 147 and 156 is preferred because of the noise rejection obtained, it will be obvious that the desired form of deflection signals would be provided by integrating directly the summation signals on lines 126, 135, 146 and 155. In that case the summation networks 123, 132, 143 and 152; the inverters 121 and 141 and the difference amplifiers 127, 136, 147 and 156 could be eliminated. It is to be understood, therefore, that the invention can be practiced otherwise than as specifically described.

What is claimed is:

1. An image registration system comprising scanning means for simultaneously directing first and second scanning beams over corresponding paths in a pair of images having relatively homologous detail content, signal generating means for producing first and second video signals representing image detail in the corresponding paths scanned by said scanning beams, correlation means adapted to correlate said first and second video signals and to produce a raw error signal indicative of composite misregistration between the image detail in the corresponding paths, waveform generator means for producing a reference signal, analyzer means for analyzing said raw error signal with respect to said reference signal and for producing parallax error signals representing particular types of misregistration between the image detail in the corresponding paths, modulation means adapted to differentially modulate said analyzed error signals with said reference signal producing modulated error signals of opposite polarity, and combining means connected to combine said modulated error signals with said reference signal and adapted to produce therewith deflection signals that are applied to said scanning means.

2. An image registration system according to claim 1 wherein said deflection signals comprise one deflection signal having a value proportional to the algebraic summation of said reference signal and said modulated error signals of one polarity and another deflection signal having a value proportional to the algebraic summation of said reference signal and a complementary modulated error signals of the opposite polarity.

3. An image registration system according to claim 2 wherein said scanning means comprises a first deflection control means for deflecting said first scanning beam and a second deflection control means for deflecting said second scanning beam, said one deflection signal is applied to said first deflection control means, and said another deflection signal is applied to said second deflection control means.

4. An image registration system according to claim 3 wherein said modulation means is adapted to produce amplitude modulation of said analyzed error signals.

5. An image registration system according to claim 4 wherein said modulation means produces said modulation by multiplying said analyzed error signals by said reference signal.

6. An image registration system according to claim 5 wherein said modulation means comprises a plurality of modulators each connected to receive one of said analyzed error signals.

7. An image registration system according to claim 6 wherein each of said modulators comprises a dual, matched field effect transistor having common drain electrodes connected to receive one of said analyzed error signals.

8. An image registration system according to claim 7 wherein each of said modulators comprise a differential amplifier connected to amplify the dual outputs of said field effect transistor.

9. An image registration system according to claim 8 wherein said reference signal is applied differentially to the gate electrodes of said dual transistors.

10. An image registration system according to claim 5 wherein said combining circuit means combines said reference signal and said modulated error signals to produce a first summation signal, inverts the polarity of said reference signal and combines the resultant complementary reference signal and said complementary modulated error signals to produce a second summation signal, combines said reference signal and said complementary modulated error signals to produce a third summation signal, combines sad complementary reference signal and said modulated error signals to produce a fourth summation signal, obtains the difference between said first and second summation signals to produce said one deflection signal, and obtains the difference between said third and fourth summation signals to produce said another deflection signal.

11. An image registration system according to claim 10 wherein said modulation means comprises a plurality of modulators each connected to receive one of said analyzed error signals.

12. An image registration system according to claim 11 wherein each of said modulators comprises a dual, matched field effect transistor having common drain electrodes connected to receive one of said analyzed error signals.

13. An image registration system according to claim 12 wherein each of said modulators comprise a differential amplifier connected to amplify the dual outputs of said field effect transistor.

14. An image registration system according to claim 13 wherein said reference signal is applied differentially to the gate electrodes of said dual transistors.

15. An image registration system according to claim 6 wherein said analyzer circuit means is adapted further to produce a scanning pattern size control signal, said modulator means differentially modulates said control signal with said reference signal producing modulated reference control signals of opposite polarity that are both applied to said modulators receiving said error signals so as to produce said differential modulation thereof.

16. An image registration system according to claim 15 wherein each of said modulators comprises dual, matched field effect transistor having common drain electrodes connected to receive one of said analyzed error signals.

17. An image registration system according to claim 16 wherein each of said modulators comprise a differential amplifier connected to amplify the dual outputs of said field effect transistor.

18. An image registration system according to claim 17 wherein said reference control signals of opposite polarity are applied to the gate electrodes of said dual transistors.

19. An image registration system according to claim 1 wherein said reference signal produced by said waveform generator means comprises $x$ and $y$-reference signals adapted for generating scanning patterns having scanning lines oriented in orthogonally related $x$ and $y$ directions.

20. An image registration system according to claim 19 wherein said analyzed error signals comprise $x$-error signals representing image detail misregistration in the $x$-direction of said scanning patterns and $y$-error signals representing image detail misregistration in the $y$-direction of said scanning patterns.

21. An image registration system according to claim 20 wherein said modulation means differentially modulates said $x$-error signals with said $x$-reference signal producing modulated $x$-error and complementary $x$-error signals of opposite polarity and differentially modulates said $y$-error signals with said $y$-reference signals producing modulated $y$-error and complementary $y$-error signals of opposite polarity.

22. An image registration system according to claim 21 wherein said deflection signals comprise one $x$-deflection signal having a value proportional to the algebraic summation of said $x$-reference signal and said modulated $x$-error signals, another $x$-deflection signal having a value proportional to the algebraic summation of said $x$-reference signal and said complementary modulated x-error signals, one y-deflection signal having a value proportional to the algebraic summation of said y-reference signal and said modulated y-error signals, and another y-deflection signal having a value proportional to the algebraic summation of said y-reference signal and said complementary modulated y-error signals.

23. An image registration system according to claim 22 wherein said scanning means comprises a first deflection control means for deflecting said first scanning beam and a second deflection control means for deflecting said second scanning beam, said one x-deflection signal and said one y-deflection signal are applied to said first deflection control means, and said another x-deflection signal and said another y-deflection signal are applied to said second deflection control means.

24. An image registration system according to claim 23 wherein said modulation means is adapted to produce amplitude modulation of said x and y-error signals.

25. An image registration system according to claim 24 wherein said modulation means produces said modulation by multiplying said x-error signals by said x-reference signal and by multiplying said y-error signals by said y-reference signal.

26. An image registration system according to claim 25 wherein said combining circuit means combines said x-reference signal and said modulated x-error signals to produce a first x-summation signal, inverts the polarity of said x-reference signal and combines the resultant complementary x-reference signal and said complementary modulated x-error signals to produce a second x-summation signal, combines said x-reference signal and said complementary modulated x-error signals to produce a third x-summation signal, combines said complementary x-reference signal and said modulated x-error signals to produce a fourth x-summation signal, obtains the difference between said first and second x-summation signals to produce said one x-deflection signal, and obtains the difference between said third and fourth x-summation signals to produce said another x-deflection signal.

27. An image registration system according to claim 26 wherein said combining circuit means combines said y-reference signal and said modulated y-error signals to produce a first y-summation signal, inverts the polarity of said y-reference signal and combines the resultant complementary y-reference signal and said complementary modulated y-error signals to produce a second y-summation signal, combines said y-reference signal and said complementary modulated y-error signals to produce a third y-summation signal, combines said complementary y-reference signal and said modulated y-error signals to produce a fourth x-summation signal, obtains the difference between said first and second y-summation signals to produce said one y-deflection signal, and obtains the difference between said third and fourth y-summation signals to produce said another y-deflection signal.

28. An image registration system according to claim 27 wherein said modulation means comprises a plurality of modulators each connected to receive one of said analyzed error signals.

29. An image registration system according to claim 28 wherein each of said modulators comprises a dual, matched field effect transistor having common drain electrodes connected to receive one of said analyzed error signals.

30. An image registration system according to claim 29 wherein each of said modulators comprise a differential amplifier connected to amplify the dual outputs of said field effect transistor.

31. An image registration system according to claim 30 wherein said reference signal is applied differentially to the gate electrodes of said dual transistors.

* * * * *